United States Patent Office 2,826,002
Patented Mar. 11, 1958

2,826,002

SOIL CONDITIONING AND FERTILIZING

Leo J. Novak and Everette E. Witt, Dayton, Ohio, assignors to The Commonwealth Engineering Company of Ohio, Dayton, Ohio, a corporation of Ohio No Drawing. Application August 18, 1953
Serial No. 375,056

23 Claims. (Cl. 47—1)

This invention relates to methods and compositions for simultaneously fertilizing and modifying the physical structure of soil.

To be productive and give good crop yields top soil and soils of sub-surface strata must comprise plant nutrients. In addition, the soil must be porous and have the capacity of retaining moisture without becoming water-logged or caking when exposed to moisture. If the soil has a structure such that it rapidly loses moisture by evaporation from the surface due to excessive capillary action, plants growing therein are deprived of the required supply of moisture, which should be continuous and abundant. Soils which tend to pack or form into large unwieldy masses on wetting do not favor flourishing plant life since, in such soils, germination of seeds planted therein is poor and, also, the growth of plant roots and stems is retarded.

It is also known that soils which cannot absorb water without "puddling" are subject to erosion by rain, with washing away of large quantity of soil because the soil neither absorbs the water at the surface nor transmits it to soil underlying the surface.

Some improvement in the structure and minimization of erosion can be achieved by careful working such as raking and plowing to loosen the soil structure so that it will absorb and retain moisture and also permit the passage of sufficient air for satisfactory plant propagation. However, the improvement obtained by such working is not of lasting duration and, as is known, the action of rain and sun soon causes the soil to slake and form a dense, packed structure having a hard impervious crust. More permanent improvement in the soil structure and productivity can be attained by cultivating the soil over a period of years, with the addition of organic fertilizers thereto, but the improvement is cumulative, and arrived at slowly.

It has been observed that, in general, soils which have a poor structure are also generally deficient in plant nutrients, and if it is attempted to eliminate the lack by adding large amounts of fertilizers to the soil, it is found that the added nutrients are lost by the leaching action of rain before they have been assimilated by plants growing in the soil. The result is that frequent addition of fertilizer to the soil is required and only a comparatively small amount of the added fertilizer is utilized by plants.

The primary object of this invention is to provide compositions which improve the structure of the soil and at the same time release plant nutrients thereto.

This and other objects of the invention are accomplished, according to this invention, by the provision of new compositions comprising a mixture of dextran and plant nutrients in which the dextran component functions to modify the soil structure by binding and stabilizing the soil particles into small easily workable discrete aggregates or crumbs and also to release nutrients physically combined therewith to the soil at controlled rates such that assimilation thereof by plants growing in the soil is facilitated and a greater proportion of the nutrients is assimilated than when the nutrients are added without the dextran or separately therefrom.

The dextrans are branched polysaccharides made up of anhydroglucopyranosidic units and characterized by the fact that those units are linked by molecular structural repeating linkages at least 50% of which are, apparently, alpha-1,6 linkages, the remaining linkages being of the non-alpha-1,6 type.

Dextran may vary with respect to its physical properties, such as molecular weight, molecular structural repeating alpha-1,6 to non-alpha-1,6 linkages ratio, and water-sensitivity.

The dextran used in combination with the plant nutrients in accordance with this invention is a hydratable, including water-soluble, dextran having a molecular weight between 5,000 and $150 \times 10^6$, as determined by light scattering measurements. More specifically, and as explained below, the dextran component of the composition may have a high average molecular weight and high molecular structural repeating alpha-1,6 to non-alpha-1,6 linkages ratio, a comparatively low average molecular weight, or comprise a mixture of dextran having a relatively high average molecular weight with a dextran having a relatively low average molecular weight.

The dextran may be obtained in any suitable way. For example, it may be obtained microbiologically, by inoculating a medium containing sucrose, particular nitrogenous compounds and certain inorganic salts with an appropriate bacterium, such as those of the *Leuconostoc mesenteroides* and *L. dextranicum* types, and incubating the inoculated medium at the temperature most favorable to the growth of the microorganism until the dextran is produced.

The dextran may be initially water-soluble or initially insoluble or substantially insoluble in water but hydratable or swellable by water when exposed thereto.

In one method of obtaining an initially water-soluble high average molecular weight dextran, an aqueous medium containing, by weight, 10% sucrose, 2% corn steep liquor, 0.5% monobasic potassium phosphate, 0.002% manganous sulfate and 0.50% sodium chloride is adjusted to a pH of between about 6.5 and about 7.5, preferably 7.2, and sterilized. The material is cooled to room temperature and inoculated with a culture of *Leuconostoc mesenteroides* B-512 (Northern Regional Research Laboratory classification) and incubated at 20° C. to 30° C. (optimum 25° C.) until a maximum yield of dextran has been attained; normally a period of between 12 and 48 hours will be satisfactory for this procedure. The fermentate is a thick turbid liquid.

Upon completion of the fermentation, which process renders the material somewhat acid, that is, to a pH of 3.5–5.5 (average 4.2), calcium chloride is added to the ferment to bring the pH thereof to about 7.0 to 8.0. This aids in the precipitation of phosphates. Thereafter acetone or alcohol, which may be a water-miscible aliphatic, such as methanol, ethanol or isopropanol, is added in sufficient quantity to precipitate the dextran and this brings down, with the dextran, occluded and adsorbed bacteria and enzyme and nitrogenous and inorganic elements. To occasion complete precipitation of the dextran it may be desirable to allow the mix to stand for a relatively long period, such as about 6 hours. The precipitate thus obtained comprises the "impurities" thrown down with the dextran. That precipitate, as well as the crude fermentate, may be used to condition soil and as both products contain nitrogenous and other impurities which have plant nutritive value, they contribute to plant nutrition. However, those products comprising bacteria and enzyme require sterilization before they are packaged and stored for future use. For the present purposes, the dextran is preferably separated from the impurities in any suitable way, as by thorough washing, and then dried and reduced to a powder. The dextran may be drum-dried to obtain a fluffy product which can be ground to a powder of desired fineness, or the powder may be obtained directly by spray-drying or lyophilization. Production of the pure or substantially pure dextran is facilitated by adding an aliphatic alcohol to the fermented culture at a pH between about 2.5 and 4.5. The precipitated dextran may be further purified by one or more re-precipitations with the alcohol, finally dried and powdered.

The dextran produced as described is a water-soluble "native" dextran of high average molecular weight. It may be used as such, in combination with plant nutrients, in the practice of this invention. Other "native" high average molecular weight dextrans which are water-soluble and obtained by similar procedures but using other microorganisms such as those bearing NRRL classifications Leuconostoc mesenteroides B–119, B–1146 and B–1190 may be used.

Instead of water-soluble dextran, there may be used "native" dextran which is insoluble or substantially insoluble in water but swellable thereby, such as dextran obtained using the microorganisms (NRRL) Leuconostoc mesenteroides B–742, B–1191, B–1196, B–1208, B–1216, B–1120, B–1144 or B–523, Streptobacterium dextranicum B–1254 or Betabacterium vermiforme B–1139.

The dextran mixed with the plant nutrients may have a comparatively low average molecular weight. Such dextran may be obtained in any suitable way. For instance, it may be obtained by hydrolysis of a "native" or comparatively high molecular weight dextran, by means of acid or enzymatically. The hydrolysis product may be fractionated to obtain a product of uniform or more nearly uniform molecular weight as is conventional, for instance, in the production of "clinical" dextran for use as a blood plasma extender by the method involving acid hydrolysis of a "native" dextran followed by fractionation of the hydrolysis product to obtain a fraction of optimum molecular weight for use in a parenteral injection fluid. In that method, the dextran having molecular weights which are unsuitable for intravenous injection are presently discarded as waste, including the low molecular weight fraction having an average molecular weight in the range 5,000 to 50,000. Very conveniently that low average molecular weight fraction is combined with plant nutrients for use in accordance with this invention to simultaneously condition and fertilize soil.

The dextran used with the fertilizing nutrients may be prepared by methods other than those mentioned above. It may be prepared enzymatically, in the substantial absence of bacteria, by cultivating a suitable bacterium, such as Leuconostoc mesenteroides B–512 to obtain a dextran-producing enzyme, separating the enzyme from the medium in which it is produced, and introducing the enzyme into a medium in which dextran is produced by the action of the enzyme. Or the dextran may be obtained by bacterial conversion of 1,4 linkages of dextran to 1,6 linkages of dextran or in any other feasible way.

The plant nutrients mixed with the dextran for the present purposes may be organic fertilizers, including sewage, sludge, processed sewage, "Milorganite," urea, soybean meal, guano, dried blood, humus, animal manures, compost, bone meal, sawdust, peat moss, animal tankage and other plant and animal waste products, or they may be inorganic, including limestone, ammonium salts, potassium salts, nitrates, phosphates, and other compounds containing nitrogen, potassium, calcium and phosphorus, as well as the essential trace elements such as boron, manganese, magnesium, cobalt, molybdenum, iron, etc.

The dextran component of these new compositions exerts its soil-conditioning and soil-stabilizing action when it is exposed to moisture while in contact with the soil. It appears that the moisture causes the dextran to dissolve or swell and form a film over the soil particles with the films on adjacent particles tending to adhere to bond the particles into small, discrete aggregates or crumbs. In addition, the dextran serves as a carrier for the fertilizer or plant nutrient component or components which acts to protect the nutrients from leaching and to control and regulate the rate at which the nutrients are released to the soil so that a steady supply of the nutrients to the soil, at a rate commensurate with the rate at which they are assimilated is assured. This regulatory effect is generally more pronounced when a difficult or slowly soluble dextran, or one which absorbs water slowly with progressive distention or swelling of the dextran, is used, such as the initially substantially water-insoluble but ultimately water-swellable "native" dextran obtained using the microorganism Leuconostoc mesenteroides B–523.

It is recognized that organic fertilizers generally possess relatively small fertilizing or nutrient value. For that reason, the nutrient combined with the dextran in the practice of this invention is preferably a mineral fertilizer having high nitrogen, phosphorus and potassium content and which may have minor concentrations of other elements required for plant growth. Fertilizers of this type usually are comprised essentially of nutrient minerals and may have from 15 to 50% of their weight as elemental nitrogen, phosphorus pentoxide and potassium monoxide.

Typical soil conditioning and nourishing or fertilizing compositions according to the invention may comprise a mixture of, by weight, 1.0 to 99 parts of dextran, and conversely, 99 to 1.0 part fertilizer. Generally, mixtures of from 10 to 90 parts dextran and 90 to 10 parts fertilizer are satisfactory although mixtures having other proportions such as 70 parts dextran, 30 parts fertilizer or 60 parts dextran, 40 parts fertilizer may be preferred. A useful fertilizer may comprise from 6 to 10% elemental nitrogen, from 10 to 15% of phosphorus pentoxide and from 4 to 10% of potassium monoxide.

The dextran and fertilizer or nutrient may be mixed together in dry, particulate conditions and intimately mixed with the soil by applying the mix to the soil and then incorporating it to the desired depth by spading, disking, harrowing or other mixing methods commonly employed in agriculture while the soil contains sufficient moisture to permit ready incorporation of the dextran-nutrient composition therein. Water may be applied to the soil after admixture thereof with the dextran-nutrient mixture or rainfall or moisture present in the soil may be relied on to solve or swell the dextran.

Alternatively, the dextran-nutrient composition may be applied to the soil in aqueous medium.

A very effective modification of these methods, and one which is welcomed by farmers, is to provide the compositions comprising the intimate mixture of dextran and fertilizer in pelletized form for implanting in the soil to the desired depth. Pellets of these compositions may be readily obtained by grinding a mixture of the dextran and nutrient to finely divided condition or by blending the separately ground materials, treating the mixture with sufficient water or other suitable solvent or swelling agent for the dextran, to develop the latent adhesiveness characteristic thereof, and molding the resulting paste-like mass as by extruding it through a die under pressure to obtain a rod which can be cut into pellets of appropriate size for incorporation in the soil and in which the dextran and nutrient particles are bonded together as a result of the adhesiveness of the dextran.

It has been found, as disclosed in the pending application of E. E. Witt and L. H. Novak, filed August 14, 1953, Ser. No. 374,428, that a definite relationship exists as between the efficiency of dextran as soil conditioner and stabilizer and the particle size of the soil. Thus, it has been demonstrated that dextran of high average molecular weight, i. e., a weight between about 100,000 and an average molecular weight equivalent to or corresponding to that of "native" dextran produced microbiologically under conditions favoring high molecular weight dextran production, is more effective in stabilizing fine clay and silt particles into discrete crumblike aggregates than it is in aggregating and stabilizing coarse sand particles, whereas dextran of relatively low average molecular weight such as between about 5,000 and about 50,000 is specifically effective in stabilizing the coarse sand particles. Therefore, the dextran may be selected for combination with the fertilizer on the basis of its molecular weight, having regard to the components present or predominant in the soil to be treated. Also, mixtures of dextran having an average molecular weight of 100,000 or above and dextran having an average molecular weight of 5,000 to 50,000 may be used to treat soil comprising clay, silt and sand and secure improved stabilization of the soil as a whole. Such dextran mixtures may comprise, by weight, from 35% to 65% of the dextran having the relatively high (100,000 or above) average molecular weight and, conversely, from 65% to 35% of the dextran of relatively low (5,000 to 50,000) average molecular weight. Usually, mixtures of 50% of each dextran type are satisfactory. The dextrans may be individual materials which are mixed together to obtain the dextran component of the dextran-fertilizer composition, for instance a mixture of "native" substantially unhydrolyzed dextran obtained by inoculating a medium containing about 5–10% of sucrose with *Leuconostoc mesenteroides* B-512 and incubating the culture with the fraction of average molecular weight 5,000 to 50,000 separated from "clinical" dextran in the course of producing the latter by a method involving acid hydrolysis of "native" high average molecular weight and fractionating the hydrolyzed material to obtain the "clinical" dextran. Or dextran comprising fractions of a molecular weight such that from 35% to 65% by weight of the dextran has an average molecular weight of at least 100,000 and from 65% to 35% by weight thereof has an average molecular weight of 5,000 to 50,000 may be used as the dextran component of the compositions. The relative proportions of high and low molecular fractions in dextran can be controlled, in the case of microbiologically produced dextran, by controlling the amount of sucrose in the medium inoculated with the dextran-producing microorganism. Increase in the proportion of sucrose present in the medium above 10% and up to about 20% results in an increase in the proportion of the dextran having relatively low average molecular weight, and the composition of the medium may be adjusted so that the dextran produced is made up of the relatively low and relatively high average molecular weight fractions in the desired proportions.

Dextran may vary with respect to its molecular structural repeating alpha-1,6 to non-alpha-1,6 linkages ratio. The dextran combined with fertilizer to obtain the pellets and other compositions for use in practicing this invention may have a molecular structural repeating alpha-1,6 to non-alpha-1,6 linkages ratio in the range between 1.9:1 and 30:1, but high linkages ratios such as in the range between 10:1 and 30:1 may be preferred.

The following examples in which parts are by weight are given to illustrate specific embodiments of the invention.

*Example I*

A soil conditioning and fertilizing composition is obtained by intimately mixing 50 parts of particulate water-soluble unhydrolyzed native high average molecular weight B-512 dextran with 50 parts of inorganic mineral fertilizer consisting of 4% elemental nitrogen, 12% phosphorus pentoxide and 4% potassium monoxide, and grinding the mixture to obtain a finely divided flowable intimate mixture for application to soil.

*Example II*

About 70 parts of particulate unhydrolyzed high molecular weight "native" water-swellable B-523 dextran are ground with 10 parts of potassium sulfate and 20 parts of superphosphate to obtain an intimate finely divided mixture. The mixture is moistened with water to form a paste-like mass and extruded through a die to obtain a rod having a diameter of 2 mm. which is then cut to 1-inch lengths for planting in soil.

*Example III*

About 70 parts of a mixture of 50% dextran having an average molecular weight between 5,000 and 50,000 (the low-molecular weight fraction from "clinical" dextran production) and 50% "native" unhydrolyzed high molecular weight B-512 dextran are ground with 30 parts of inorganic mineral fertilizer consisting of, by weight, 6% elemental nitrogen, 10% phosphorus pentoxide, a 4% potassium oxide, to obtain a finely divided readily flowable composition for soil application.

Certain synthetic polymeric polyelectrolytes which are organic substances forming, when contacted with an aqueous medium, organic ions having a substantial number of electrical charges distributed at a plurality of positions thereon, have been found to exhibit soil conditioning and stabilizing action. Included among these polyelectrolytes are the water-soluble equimolar copolymers of polycarboxylic acid derivatives with at least one co-polymerizable monomer and, also, polymers and copolymers from acrylic or methacrylic acid. Typical of these are the hydrolyzed polymers of acrylonitrile and the sodium and calcium salts thereof. The soil conditioning material marketed under the name "Krilium" is of this type.

It has been found that these synthetic polymeric polyelectrolytes, which are normally rather expensive, can be advantageously diluted with varying amounts, from 10% to 65%, of dextran having an average molecular weight of 5,000 to 50,000, for decrease in the cost without marked reduction in soil stabilization and improvement in the stability of sand particles present in the soil. Such mixtures of the low molecular weight dextran and synthetic polymeric polyelectrolytes may be mixed with fertilizer in the manner described above.

The use of the dextran as soil conditioner and carrier for the fertilizer or plant nutrient component permits of a reduction in the frequency of application of fertilizer to the soil since the dextran functions to regulate the rate at which the fertilizer is released so that there is an approximate correlation between the release of the fertilizer to the soil and the rate of its assimilation, and, also, protects the fertilizer against leaching.

The amount of the stabilizing-fertilizing composition applied to the soil may be varied depending on the relative proportions of dextran and fertilizer in the composition. Amounts to provide dextran in a concentration between 0.1% and 5% by weight, for instance 0.3% to 0.6%, based on soil weight are usually satisfactory, the particular proportionate ratio of dextran to fertilizer depending on the condition of the soil with respect to its nutrient content, the compositions having the higher fertilizer concentration being desirable when for any reason the soil is markedly deficient in nutrient factors.

The molecular weights given for the dextran are determined by light scattering measurements.

It will be understood that while specific embodiments of the invention have been discussed it is not intended to limit or circumscribe the invention by the details given in view of the fact that the invention is susceptible of modifications and variations which are within the scope of this disclosure and of the appended claims.

We claim:
1. A pellet or the like for implantation in soil to simultaneously condition and fertilize the same, said pellet consisting essentially of an intimate particulate mixture of 10% to 65% by weight, of hydratable, including water-soluble, microbiologically produced dextran having an average molecular weight of 5,000 to 50,000, from 35% to 90% by weight, of a water-soluble, synthetic polymeric polyelectrolyte, and solid plant nutrient material added to the dextran after separation thereof from the fermentate in which it is microbiologically produced.

2. A composition for simultaneously conditioning and fertilizing soil which consists essentially of an intimate mixture of from 10 to 90 parts by weight of particulate, hydratable, including water-soluble, microbiologically produced dextran and from 10 to 90 parts by weight of inorganic fertilizer.

3. The method of simultaneously conditioning and fertilizing soil which comprises adding to the soil a conditioning and fertilizing mixture consisting essentially of 10 to 90 parts by weight of hydratable, including water-soluble, particulate microbiologically produced dextran and plant nutrient material added to the dextran after separation thereof from the fermentate in which it is microbiologically produced, the soil and conditioning and fertilizing mixture in contact with each other being wet with water to effect at least partial solvation of the dextran, whereby the dextran bonds particles of the soil together and the plant nutrient is released to the soil.

4. A method of treating soil to simultaneously condition and fertilize it which comprises the step of incorporating in the soil pellets consisting essentially of an intimate mixture of from 10 to 90 parts by weight of particulate hydratable, including water-soluble, microbiologically produced dextran and from 90 to 10 parts by weight of solid plant nutrient material added to the dextran after separation thereof from the fermentate in which it is microbiologically produced.

5. A method of simultaneously conditioning and fertilizing soil which comprises treating the soil with an intimate particulate mixture of from 10 to 90 parts by weight of hydratable, including water-soluble, microbiologically produced dextran and from 90 to 10 parts by weight of solid plant nutrient material added to the dextran after separation thereof from the fermentate in which it is microbiologically produced, the soil and particulate mixture in contact with each other being wet with water whereby the dextran is at least partially solvated.

6. A method of simultaneously conditioning and fertilizing soil which comprises treating the soil with an intimate, particulate mixture consisting essentially of 10 to 90 parts by weight of hydratable, including water-soluble, microbiologically produced dextran having an average molecular weight of 5,000 to 50,000 and from 90 to 10 parts by weight of solid plant nutrient material added to the dextran after separation thereof from the fermentate in which it is microbiologically produced, the soil and particulate mixture in contact with each other being wet with water whereby the dextran is at least partially solvated.

7. A method of simultaneously conditioning and fertilizing soil which comprises incorporating in the soil an intimate particulate mixture of 35% to 65% by weight, hydratable, including water-soluble, microbiologically produced dextran having an average molecular weight of 5,000 to 50,000, from 35% to 65% by weight, hydratable, including water-soluble, microbiologically produced dextran having an average molecular weight of at least 100,000, and solid plant nutrient material added to the dextran after separation thereof from the fermentate in which it is microbiologically produced, the mixture, in contact with the soil, being wet with water whereby the dextran is at least partially solvated.

8. A method of simultaneously conditioning and fertilizing soil which comprises incorporating in the soil an intimate particulate mixture of 10% to 65% by weight, hydratable, including water-soluble, microbiologically produced dextran having an average molecular weight of 5,000 to 50,000, 35% to 90% of a water-soluble synthetic polymeric polyelectrolyte, and solid plant nutrient material added to the dextran after separation thereof from the fermentate in which it is microbiologically produced, the particulate mixture, in contact with the soil, being wet with water whereby the dextran is at least partially solvated.

9. A method of simultaneously conditioning and fertilizing soil which comprises incorporating in the soil an intimate mixture comprising particulate, hydratable, including water-soluble, dextran and solid plant nutrient material and wetting the mixture in contact with the soil with water to thereby at least swell the dextran.

10. A composition for simultaneously introducing fertilizer and a soil conditioning agent into soil and consisting essentially of a particulate intimate mixture of 1 to 99 parts by weight of solid plant nutrients and 99 to 1 parts of a water-dispersible dextran having the molecular structural repeating 1,6 to non-1,6 linkages ratio of dextran produced by the action on sucrose of a dextran-synthesizing strain of *Leuconostoc mesenteroides* and a molecular weight between 5000 and that of the native unhydrolyzed dextran produced by said strain.

11. A composition for simultaneously introducing fertilizer and a soil conditioning agent into soil and consisting essentially of a particulate intimate mixture of 1 to 99 parts by weight of solid plant nutrients and 99 to 1 parts of a water-dispersible dextran having the molecular structural repeating 1,6 to non-1,6 linkages ratio of dextran produced by the action on sucrose of a dextran-synthesizing strain of *Leuconostoc mesenteroides* and a molecular weight between 5000 and that of the native unhydrolyzed dextran produced by said strain, 35% to 65% of the dextran having an average molecular weight of at least 100,000.

12. A composition for simultaneously introducing fertilizer and a soil conditioning agent into soil and consisting essentially of a particulate intimate mixture of 30 to 70 parts by weight of solid plant nutrients and 70 to 30 parts of a water-dispersible dextran having the molecular structural repeating 1,6 to non-1,6 linkages ratio of dextran produced by the action on sucrose of a dextran-synthesizing strain of *Leuconostoc mesenteroides* and a molecular weight between 5000 and that of the native unhydrolyzed dextran produced by said strain.

13. A composition for simultaneously introducing fertilizer and a soil conditioning agent into soil and consisting essentially of a particulate intimate mixture of 60 to 40 parts by weight of solid plant nutrient and 40 to 60 parts of a water-dispersible dextran having the molecular structural repeating 1,6 to non-1,6 linkages ratio of dextran produced by the action on sucrose of a dextran-synthesizing strain of *Leuconostoc mesenteroides* and a molecular weight between 5000 and that of the native unhydrolyzed dextran produced by said strain.

14. A composition for simultaneously introducing fertilizer and a soil conditioner into soil and consisting essentially of a particulate, intimate mixture of 1 to 99 parts by weight of solid plant nutrients and 99 to 1 parts of water-dispersible dextran having the molecular structural repeating 1,6 to non-1,6 linkages ratio of the dextran produced by the action on sucrose of the dextran-synthesizing strain of *Leuconostoc mesenteroides* classified as NRRL B–512, and the molecular weight of the unhydrolyzed dextran produced by said strain.

15. A composition for simultaneously introducing fertilizer and a soil conditioner into soil and consisting essentially of a particulate, intimate mixture of 1 to 99 parts by weight of solid plant nutrients and 99 to 1 parts of water-dispersible dextran having the molecular structural repeating 1,6 to non-1,6 linkages ratio of the dextran produced by the action on sucrose of the dextran-synthesizing strain of *Leuconostoc mesenteroides* classified as NRRL B–523, and the molecular weight of the unhydrolyzed dextran produced by said strain.

16. The method of simultaneously conditioning and fertilizing soil which comprises adding to the soil an intimate mixture of 1 to 99 parts by weight of plant nutrients and 17. The method of simultaneously conditioning and fertilizing soil which comprises adding to the soil an intimate mixture of 1 to 99 parts by weight of plant nutrients and 99 to 1 parts of a water-dispersible dextran having the molecular structural 1,6 to non-1,6 linkages ratio of the dextran produced by the action on sucrose of a dextran synthesizing strain of *Leuconostoc mesenteroides* and a molecular weight between 5000 and that of the native unhydrolyzed dextran produced by said strain, at least 35% to 65% by weight of the dextran having a molecular weight of at least 100,000, and wetting the mixture in contact with the soil with water whereby the dextran is at least swollen to bind particles of the soil into small, readily workable aggregates and release the plant nutrients to the soil.

18. The method of simultaneously fertilizing and conditioning soil which comprises adding to the soil an intimate mixture of 1 to 99 parts by weight of plant nutrients and 99 to 1 parts by weight of water-dispersible dextran having the molecular structural repeating 1,6 to non-1,6 linkages ratio of dextran produced by the action on sucrose of the dextran-synthesizing strain of *Leuconostoc mesenteroides* classified as NRRL B–512 and the molecular weight of the native, unhydrolyzed dextran produced by said strain, and wetting the mixture in contact with the soil with water whereby the dextran is at least swollen to bind the soil particles into small, readily workable aggregates and release the fertilizer.

19. The method of simultaneously fertilizing and conditioning soil which comprises adding to the soil an intimate mixture of 1 to 99 parts by weight of plant nutrients and 99 to 1 parts by weight of water-dispersible dextran having the molecular structural repeating 1,6 to non-1,6 linkages ratio of dextran produced by the action on sucrose of the dextran-synthesizing strain of *Leuconostoc mesenteroides* classified as NRRL B–523 and the molecular weight of the native, unhydrolyzed dextran produced by said strain, and wetting the mixture in contact with the soil with water whereby the dextran is at least swollen to bind the soil particles into small, readily workable aggregates and release the fertilizer.

20. The combination of soil and fertilizer-conditioner therefor consisting essentially of an intimate mixture of 1 to 99 parts by weight of plant nutrients and 99 to 1 parts of a water-dispersible dextran having the molecular structural repeating 1,6 to non-1,6 linkages ratio of the dextran produced by the action of sucrose of a dextran synthesizing strain of *Leuconostoc mesenteroides* and a molecular weight between 5000 and that of the native, unhydrolyzed dextran produced by said strain.

21. The combination of soil and a fertilizer-conditioner therefor consisting essentially of an intimate mixture of 1 to 99 parts by weight of plant nutrients and 99 to 1 parts of a water-dispersible dextran having the molecular structural repeating 1,6 to non-1,6 linkages ratio of the dextran produced by the action on sucrose of a dextran synthesizing strain of *Leuconostoc mesenteroides* and a molecular weight between 5000 and that of the native, unhydrolyzed dextran produced by said strain, at least 35% to 65% of the dextran having an average molecular weight of at least 100,000.

22. The combination of soil and a fertilizer conditioner therefor consisting essentially of 1 to 99 parts by weight of plant nutrients and 99 to 1 parts by weight of dextran having the molecular structural repeating 1,6 to non-1,6 linkages ratio of dextran produced by the action on sucrose of the dextran-synthesizing strain of *Leuconostoc mesenteroides* classified as NRRL B–512, and the molecular weight of the native, unhydrolyzed dextran produced by said strain.

23. The combination of soil and a fertilizer conditioner therefor consisting essentially of 1 to 99 parts by weight of plant nutrients and 99 to 1 parts by weight of dextran having the molecular structural repeating 1,6 to non-1,6 linkages ratio of dextran produced by the action on sucrose of the dextran-synthesizing strain of *Leuconostoc mesenteroides* classified as NRRL B–523, and the molecular weight of the native, unhydrolyzed dextran produced by said strain.

References Cited in the file of this patent

UNITED STATES PATENTS

| | | |
|---|---|---|
| 2,360,327 | Bailey | Oct. 17, 1944 |
| 2,437,518 | Gronwall | Mar. 9, 1948 |
| 2,565,507 | Lockwood | Aug. 28, 1951 |
| 2,625,471 | Mowry | Jan. 13, 1953 |
| 2,625,529 | Hedrick | Jan. 13, 1953 |

FOREIGN PATENTS

| | | |
|---|---|---|
| 641,280 | Great Britain | Aug. 9, 1950 |
| 657,693 | Great Britain | Sept. 26, 1951 |

OTHER REFERENCES

Dutt: "The effect of water-soluble potassium silicate . . .," published 1948, in Proceedings of Soil Science Society of America for year 1947, vol. 12, pages 497–501.

Geoghegan: "Aggregate formation in soil. —1. Influence of some bacterial polysaccharides . . .," published 1948, in Great Britain, in Biochemical Journal, vol. 43, pages 5–13.

The Lancet, January 22, 1949, articles on "Dextran as a plasma substitute," pages 132–143.

Ingelman et al.: "Some physico-chemical experiments on fractions of dextran," published 1949, by Almquist and Wiksells (Stockholm, Sweden), in Arkiv för Kemi, vol. 1, No. 10, pages 61–80.

Jeanes et al.: "Periodate oxidation of dextran," published June 1950, in Journal American Chemical Society, vol. 72, pages 2655–2658.

Geoghegan: "Aggregate formation in soil. Influence of some microbial . . .," published before April 17, 1951, at Groningen, Netherlands, in Fourth International Congress of Soil Science, Amsterdam, 1950, Transactions, vol. 1, pages 198–201.

Manufacturing Chemist, February 1952, pages 49–54.

Whistler: "Polysaccharide chemistry," published 1953, pages 376, 379, 380, 455, 457.